United States Patent
Ray (10) Patent No.: US 12,523,609 B2
(45) Date of Patent: Jan. 13, 2026

(54) DISTRIBUTED RAMAN H2 SENSORS

(71) Applicant: Rosemount Aerospace Inc., Burnsville, MN (US)

(72) Inventor: Mark D. Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 312 days.

(21) Appl. No.: 18/118,938

(22) Filed: Mar. 8, 2023

(65) Prior Publication Data

US 2024/0302282 A1    Sep. 12, 2024

(51) Int. Cl.
*G01N 21/65*    (2006.01)
*G01M 3/04*    (2006.01)

(52) U.S. Cl.
CPC .............. *G01N 21/65* (2013.01); *G01M 3/04* (2013.01); *G01N 2201/0636* (2013.01); *G01N 2201/08* (2013.01)

(58) Field of Classification Search
None
See application file for complete search history.

(56) References Cited

U.S. PATENT DOCUMENTS

| | | | |
|---|---|---|---|
| 7,251,027 B2 | 7/2007 | Gylys et al. | |
| 7,385,692 B1* | 6/2008 | Nguyen | G01J 3/28 356/301 |
| 7,505,126 B2 | 3/2009 | Ninomiya et al. | |
| 7,869,469 B1* | 1/2011 | Spuler | G01S 17/95 372/3 |
| 9,500,632 B2 | 11/2016 | Bertrand et al. | |
| 9,562,853 B2* | 2/2017 | Bornhop | G01N 21/45 |
| 2013/0169973 A1* | 7/2013 | Inoue | G01B 9/02091 356/497 |
| 2017/0122874 A1* | 5/2017 | Alon | G01J 3/4412 |

(Continued)

FOREIGN PATENT DOCUMENTS

| | | |
|---|---|---|
| CN | 104237161 A | 12/2014 |
| CN | 115494046 A | 12/2022 |
| WO | 8903028 A1 | 4/1989 |

OTHER PUBLICATIONS

European Patent Office, Extended European Search Report received in EP Application No. 24162400.6, Jul. 9, 2024, 8 pages.

(Continued)

*Primary Examiner* — Mark A Shabman
(74) *Attorney, Agent, or Firm* — Suiter Swantz IP (57) ABSTRACT

A gas detection system includes a first optical fiber bundle connected to a first multi-pass cell for connecting the first multi-pass cell to a Raman spectrum analyzer. A second optical fiber bundle is connected to the first multi-pass cell for connecting the first multi-pass cell to a second multi-pass cell. The second optical fiber bundle can include a delay coil configured to provide temporal spacing between spectral returns from the first multi-pass cell and from the second multi-pass cell. The first and second multi-pass cells can be biconic multipass cells with a the first optical fiber bundle directed toward a first D-mirror, which is directed toward a T-mirror, which is directed toward a second D-mirror, which is directed toward the second optical fiber bundle. The D-mirrors can be on an opposite end of the first multi-pass cell from the T-mirror and the first and second optical fiber bundles.

17 Claims, 5 Drawing Sheets

(56) References Cited

U.S. PATENT DOCUMENTS

| | | | |
|---|---|---|---|
| 2017/0350734 A1* | 12/2017 | Ji | G01D 5/35358 |
| 2022/0042959 A1 | 2/2022 | Yamane et al. | |
| 2022/0342225 A1* | 10/2022 | Rushford | G01N 21/031 |
| 2023/0372153 A1* | 11/2023 | Katchinskiy | A61B 34/25 |

OTHER PUBLICATIONS

Shen et al., "A Versatile Multiple-Pass Raman System for Industrial Trace Gas Detection," Sensors, vol. 21, No. 21, Oct. 28, 2021, 9 pages.

Yang et al., "Towards label-free distributed fiber hydrogen sensor with stimulated Raman spectroscopy," Optics Express, vol. 27, No. 9, Apr. 29, 2019, 14 pages.

* cited by examiner

DISTRIBUTED RAMAN H2 SENSORS

BACKGROUND

1. Field

The present disclosure relates to hydrogen gas detection, and more particularly to using Raman spectrometry for hydrogen gas detection, e.g. for leak detection aboard hydrogen powered aircraft or the like.

2. Description of Related Art

Hydrogen powered aircraft and other vehicles powered by hydrogen need a sensitive, fast sensor to detect a leak and activate appropriate systems to suppress buildup of a hydrogen/oxygen mixture before it could ever combust. The conventional techniques have been considered satisfactory for their intended purpose. However, there is an ever present need for improved systems and methods for hydrogen gas detection. This disclosure provides a solution for this need.

SUMMARY

A gas detection system includes a first optical fiber bundle connected to a first multi-pass cell for connecting the first multi-pass cell to a Raman spectrum analyzer. A second optical fiber bundle is connected to the first multi-pass cell for connecting the first multi-pass cell to a second multi-pass cell.

The second optical fiber bundle can include a delay coil configured to provide temporal spacing between spectral returns from the first multi-pass cell and from the second multi-pass cell. Each of the first and second optical fiber bundles can include a central illumination fiber for transmitting laser illumination. The central illumination fiber can be surrounded by a plurality of return fibers configured for transmitting return illumination from the first and second multi-pass cells.

A pulsed laser/LED illumination source can be operatively connected to the central illumination fiber of the first optical fiber bundle to illuminate multi-path interiors of the first and second multi-pass cells. A spectrum analyzer can be connected to the plurality of return fibers at an end of the first optical fiber bundle opposite the first multi-pass cell for analyzing returns from the multi-pass cells. The spectrum analyzer can be configured to detect presence of $H_2$ gas, $N_2$ gas, and $O_2$ gas in the first and second multi-pass cells based on observed spectral shifts in the returns. A third optical fiber bundle can be operatively connected to the second multi-pass cell, configured to connect to one or more additional multi-pass cells. The spectrum analyzer can be configured to locate an $H_2$ gas leak proximate one of the multi-pass cells based on timing of spectral shifts in the return. The spectrum analyzer can be configured to determine which multi-pass cell the leak is proximate to, and what location in that multi-pass cell the leaks is most proximate.

The first and second multi-pass cells each can be a biconic multipass cell with a the first optical fiber bundle directed toward a first D-mirror, which is directed toward a T-mirror, which is directed toward a second D-mirror, which is directed toward the second optical fiber bundle. The D-mirrors can be on an opposite end of the first multi-pass cell from the T-mirror and the first and second optical fiber bundles. The first multi-pass cell can include a gas permeable frame configured to expose illumination in a multi-pass pathway between the T-mirror and the D-mirrors to ambient gas. The second multi-pass cell can include an identical multi-pass pathway to that of the first multi-pass cell. The first multi-pass cell can be sized identical to the second multi-pass cell.

The second optical fiber bundle can include a delay coil configured to provide temporal spacing between spectral returns from the first multi-pass cell and from the second multi-pass cell. The first optical fiber bundle can be an initial optical fiber bundle, wherein the second optical fiber bundle either connects directly to the second multi-pass cell or to a daisy chain of one or more additional multi-pass cells alternating with delay lines, wherein the daisy chain ends with the second multi-pass cell. A terminal fiber optical bundle can operatively connect the second multi-pass cell to a laser/LED amplitude monitor. A pulsed laser/LED illumination source can be operatively connected to a central illumination fiber of the first optical fiber bundle to illuminate multi-path interiors of the multi-pass cells. A spectrum analyzer can be connected to a plurality of return fibers at an end of the first optical fiber bundle opposite the first multi-pass cell for analyzing returns from the multi-pass cells. The spectrum analyzer can be configured to detect presence of $H_2$ gas, $N_2$ gas, and $O_2$ gas in the first and second multi-pass cells based on observed spectral shifts in the returns. A 99:1 splitter can be connected to the central illumination fiber of the first optical fiber bundle. An elastic backscatter monitor can be operatively connected to the 99:1 splitter. A timing trigger photodiode can be operatively connected to the 99:1 splitter.

The second optical fiber bundle can either connect directly to the second multi-pass cell or to a daisy chain of one or more additional multi-pass cells alternating with delay lines, wherein the daisy chain ends with the second multi-pass cell. A terminal fiber optical bundle can operatively connect the second multi-pass cell to a pulsed laser/LED illumination source to illuminate multi-path interiors of the multi-pass cells. A laser/LED amplitude monitor can be operatively connected to a central illumination fiber of the first optical fiber bundle. A spectrum analyzer can be connected to a plurality of return fibers at an end of the first optical fiber bundle opposite the first multi-pass cell for analyzing returns from the multi-pass cells. The spectrum analyzer can be configured to detect presence of $H_2$ gas, $N_2$ gas, and $O_2$ gas in the first and second multi-pass cells based on observed spectral shifts in the returns. A 99:1 splitter can be connected to a central illumination fiber of the terminal optical fiber bundle. An elastic backscatter monitor can be operatively connected to the 99:1 splitter for. A timing trigger photodiode can be operatively connected to the 99:1 splitter.

A terminal fiber optical bundle can operatively connect the second multi-pass cell to a first pulsed laser/LED illumination source to illuminate multi-path interiors of the multi-pass cells. A first 99:1 splitter can be connected to a central illumination fiber of the terminal optical fiber bundle. A first elastic backscatter monitor can be operatively connected to the first 99:1 splitter. A first timing trigger photodiode can be operatively connected to the first 99:1 splitter. A spectrum analyzer can be connected to a plurality of return fibers at an end of the first optical fiber bundle opposite the first multi-pass cell for analyzing returns from the multi-pass cells. The spectrum analyzer can be configured to detect presence of $H_2$ gas, $N_2$ gas, and $O_2$ gas in the first and second multi-pass cells based on observed spectral shifts in the returns. A second 99:1 splitter can be connected to a central illumination fiber of the first optical fiber bundle. A second elastic backscatter monitor can be operatively connected to the second 99:1 splitter. A second timing trigger photodiode can be operatively connected to the second 99:1 splitter. The second elastic backscatter monitor can be a first amplitude monitor for the first pulsed laser/LED illumination source, and the first elastic backscatter monitor can be a second amplitude monitor for the second pulsed laser/LED illumination source.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
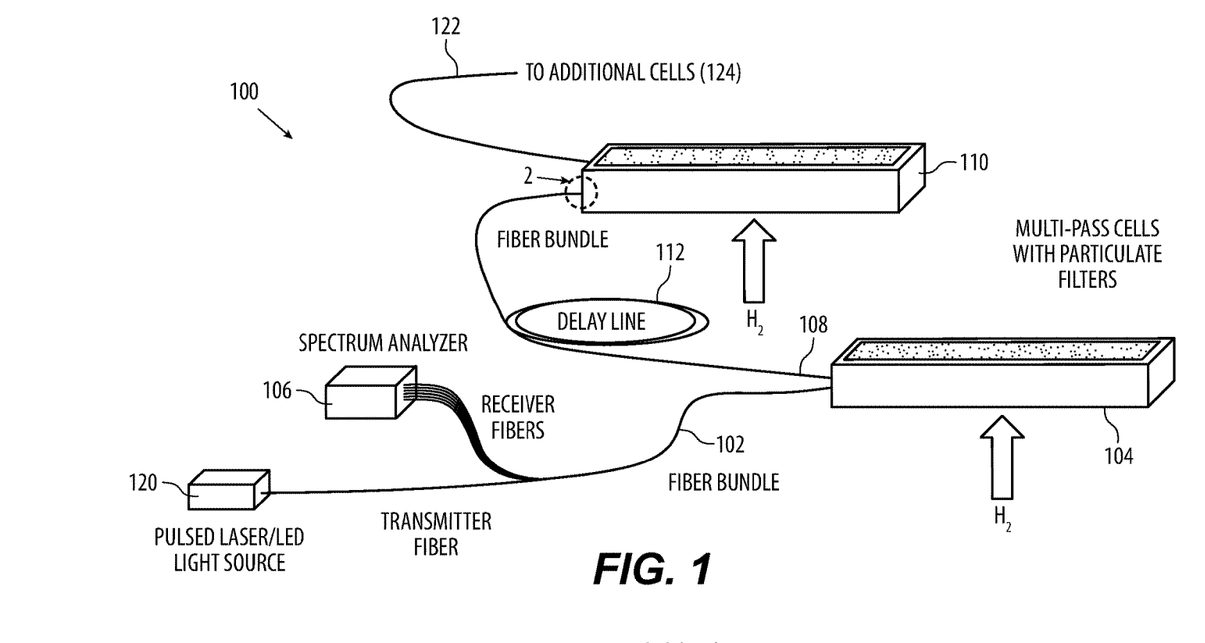
FIG. 1 is a schematic perspective view of a portion of an embodiment of a system constructed in accordance with the present disclosure, showing two of the cells and a delay line.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used for detecting and locating gaseous hydrogen leaks in aerospace and non-aerospace systems.

Rather than monitor loss along the length of the fiber, systems and methods as disclosed herein monitor Raman scattering within a multi-pass gas cell or series of concatenated cells along the fiber. The cell or cells are placed at locations where leaks are most likely to occur. Detection based on Raman scattering permits direct detection of the hydrogen gas, as well as other gases within the multi-pass cell. These gases can include at least nitrogen and oxygen, but potentially others. Hence, a single sensor measures the mixing ratio of hydrogen to oxygen, a parameter critical to assessing the potential for an explosion. The scattering from nitrogen and oxygen provides a secondary confirmation that the sensor is functioning properly. Both nitrogen and oxygen will always be present in the air, and the ratios of these gases are well-known and fixed. The continuous detection of $N_2$ and/or $O_2$ as well as $H_2$ provides a verification of operation of a sensor that regards a null signal (i.e. no $H_2$ detected) as the normal, safe condition.

Like Rayleigh scattering, Raman scattering occurs for virtually any wavelength of laser probe beam but is enhanced inversely as the fourth power of the wavelength. Hence, UV wavelengths can generate nearly an order of magnitude more scattering than visible wavelengths. Unlike Rayleigh scattering, Raman is an inelastic process, and the scattered wavelengths differ from the probe wavelength. Raman scattering occurs only for molecules. The shifts are caused by changes in the vibrational and/or rotational states of the molecules. The scattered wavelengths can be shifted either to the blue (Anti-Stokes) or to the red (Stokes) of the probe wavelength. At room temperature, Stokes Raman scattering is much more intense than anti-Stokes. Since every molecule has a unique set of rotational-vibrational states, Raman spectra serve as spectral "fingerprints" of molecules. Gaseous hydrogen, nitrogen, and oxygen all have distinctive Raman spectra that allow them all to be detected and differentiated simultaneously from a single probe laser beam.

Multi-pass gas cells increase the pathlength of a probe beam through the sample gas. Even weakly absorbing spectral features become discernible with the increased path length. Depending on the number of passes of the beam through the cell, pathlengths of tens or hundreds of meters can be compressed into cells less than one meter in length. The long pathlength is achieved by reflecting the probe beam between mirrors located at each end of the cell. These mirrors may be spherical, biconic, parabolic, or toroidal, depending on the cell geometry and the need to easily alter the number of passes of the probe beam through the cell. The mirrors must have high reflectance to maintain many passes of the probe beam without introducing excessive loss.

In this disclosure, a multi-pass cell provides the enhancement of scattering spectroscopy. Despite the relatively weak signals and the specialized hardware required for Raman spectroscopy detection of $H_2$, Raman spectroscopy has some distinct advantages over conventional hydrogen gas sensors. The detection occurs directly in the gas phase. Adsorption of hydrogen onto a sensing surface is not necessary for Raman sensing. A sensing surface for an adsorption sensor is subject to contamination and "poisoning" by other gases or liquids that contact the surface. The response time for both detection and recovery of an adsorption sensor can range from a few seconds to a few minutes. Raman scattering, in contrast, is virtually instantaneous; only the propagation of light to and from the multi-pass cell and the speed of the electronics affect the detection latency.

Systems and methods as disclosed herein use fiber optics to both transmit the laser light and receive the Raman scattering within a multi-pass cell. The transmitted laser beam exits the fiber and either after being collimated or allowed to pass directly into the multi-path cell reflects multiple times from the mirrors at either end of the cell. The style of multipath cell is not critical. White cells and Herriot cells, as well as more modern and novel designs of multipass cells, all function in a similar manner. Both the laser and Raman scattered light reflect multiple times from the mirrors within the cells. The reflectance of the mirrors must be high for both the laser wavelength and for the longer Raman wavelengths to reduce the cumulative attenuation.

A portion of the Raman scattered light retraces the optical path of the laser beam and counter-propagates down the laser transmitter fiber and any surrounding receiver fibers within the fiber bundle. The backscatter received through the laser transmitter fiber alone could be used as a receiver for Raman scattering, but an alternative is to use a close-packed fiber bundle, with the central fiber as the transmitter and the surrounding fibers as the receivers. (See FIG. 1.) Using six receiver fibers with large core sizes (e.g. 300 or 400 um diameter), for example, increases the collection efficiency over that of the laser transmitter fiber alone. As described previously, a dichroic filter within the spectrum analyzer separates the red-shifted Raman Stokes wavelengths from the laser wavelength and passes the Raman light into an appropriate device to separate and detect the nitrogen gas, oxygen gas, and hydrogen gas scattering signals. The analyzer could be a grating spectrometer or simply a series of bandpass filters coupled to highly sensitive photodetectors.

The transmitter and receiver fibers coupled to a multi-path gas cell generate a long pathlength for Raman scattering detection within a small sample volume. The long pathlength is due to the viewing angle of the Raman scattering that is nearly coincident with that of the incident laser beam that generates the scattering. The pathlength can be greater than what is possible with a side-viewing lens in a multi-pass cell, especially if the cell is much longer than the viewing length subtended by the field-of-view of the lens.

Referring now to FIG. 1, the gas detection system 100 includes a first optical fiber bundle 102 connected to a first multi-pass cell 104 for connecting the first multi-pass cell 104 to a Raman spectrum analyzer 106. A second optical fiber bundle 108 is connected to the first multi-pass cell 104 for connecting the first multi-pass cell 104 to a second multi-pass cell 110.

Figure 2:
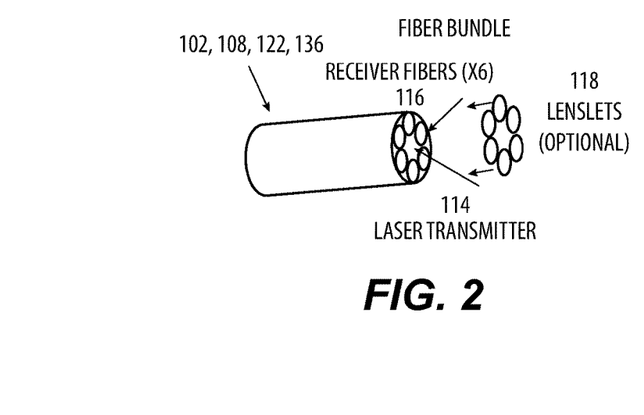
FIG. 2 is a schematic perspective view of one of the fiber bundles of FIG. 1, showing the laser transmitter core surrounded by receiver fibers.

The second optical fiber bundle 108 includes a delay coil 112 configured to provide temporal spacing between spectral returns from the first multi-pass cell 104 and from the second multi-pass cell 110. As shown in FIG. 2, each of the first and second optical fiber bundles 102, 108 includes a central illumination fiber 114 for transmitting laser illumination. The central illumination fiber 114 is surrounded by a plurality of close packed return fibers 116 configured for transmitting return illumination from the first and second multi-pass cells 104, 110. Optional lenslets 118 can be optically coupled to the respective return fibers 116.

With continued reference to FIG. 1, a pulsed laser/LED illumination source 120 for UV illumination is operatively connected to the central illumination fiber 114 (labeled in FIG. 2) of the first optical fiber bundle 102 to illuminate multi-path interiors of the first and second multi-pass cells 110, 104. Those skilled in the art will readily appreciate that a variety of wavelengths can be used in addition to or in lieu of UV, such as blue or visible generally, with varying efficiencies. The spectrum analyzer 106 is connected to the plurality of return fibers 116 (labeled in FIG. 2) at an end of the first optical fiber bundle 102 opposite the first multi-pass cell 104 for analyzing returns from the multi-pass cells 104, 110. The spectrum analyzer 106 is configured to detect the presence of $H_2$ gas, $N_2$ gas, and $O_2$ gas in the first and second multi-pass cells based on observed spectral shifts in the returns. A third optical fiber bundle 122 can be operatively connected to the second multi-pass cell 110, e.g. configured to connect to one or more additional multi-pass cells 124 in a daisy chain as described further below. The spectrum analyzer 106, including support devices or computer(s), is configured to locate an $H_2$ gas leak proximate one of the multi-pass cells 104, 110, 124 based on timing of spectral shifts in the return. The spectrum analyzer 106 is configured to determine which multi-pass cell 104, 110, 124 the leak is proximate to, and what location within that multi-pass cell 104, 110, 124 the leaks is most proximate.

Figure 3:
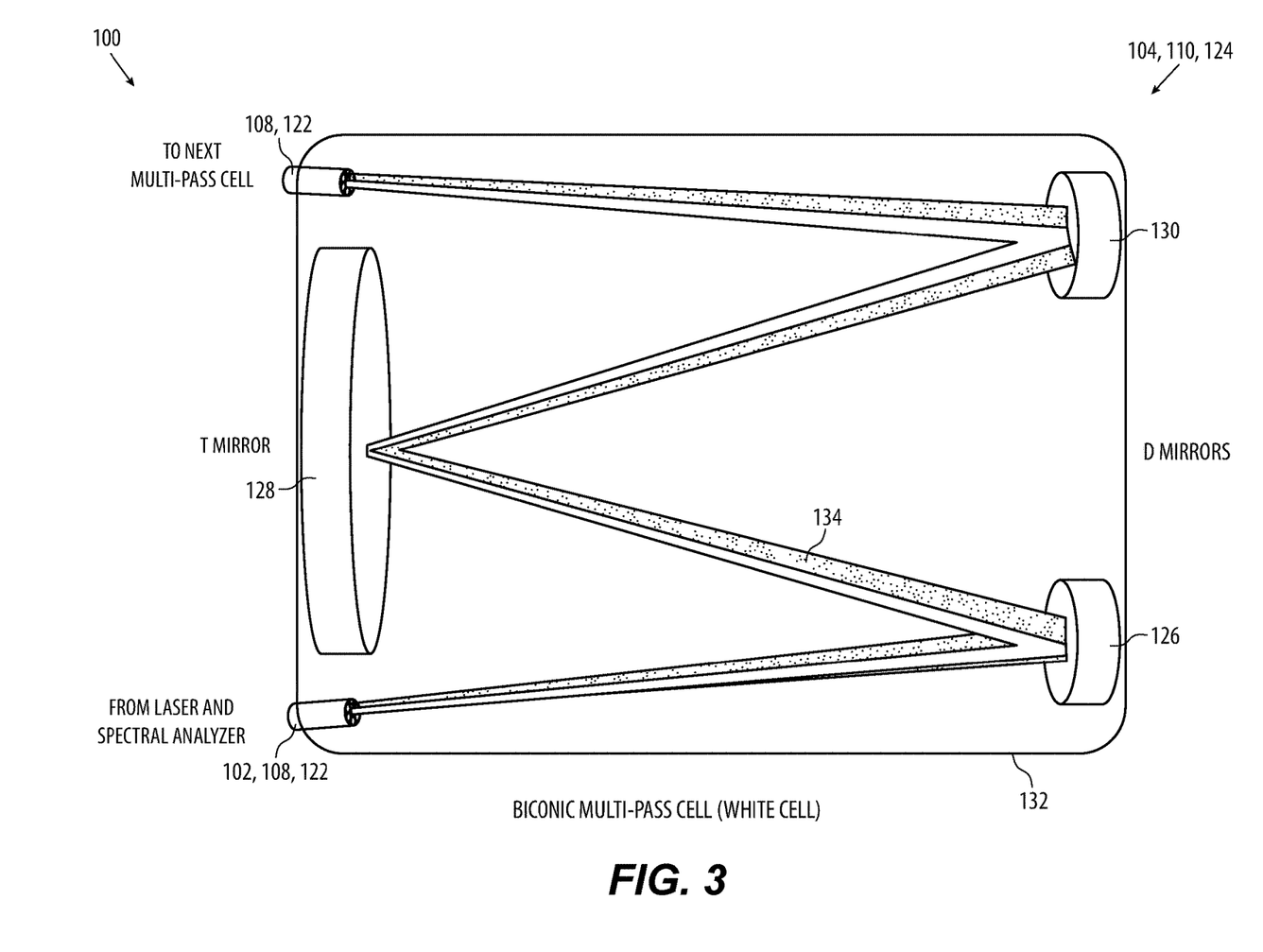
FIG. 3 is a schematic view of one of the cells of FIG. 1, showing the T-mirror and the D-mirrors.

Referring now to FIG. 3, the each of the multi-pass cells 104, 110, 124 is a biconic multipass White cell with the first optical fiber bundle 102, 108, 122 directed toward a first D-mirror 126, which is directed toward a T-mirror 128, which is directed toward a second D-mirror 130, which is directed toward the second optical fiber bundle 108, 122. The D-mirrors 126, 130 are on an opposite end of the first multi-pass cell 104, 110, 124 from the T-mirror 128 and from the optical fiber bundles 102, 108, 122. Each multi-pass cell 104, 110, 124 includes a gas permeable frame 132 configured to expose illumination 134 in a multi-pass pathway between the T-mirror and the D-mirrors 128, 126, 130 to ambient gas. In FIG. 1, potential gas leaks are indicated by the large arrows labeled $H_2$. All the multi-pass cells 104, 110, 122 can be sized identical to one another, or one or more of the cells 104, 110, 122 can be sized larger or smaller than the others, as shown in FIG. 4.

Multi-pass cells can be concatenated into a single system as shown in FIG. 1. The White cell shown in FIG. 3 repetitively images the end of the fiber bundle on the T-mirror. In a conventional White cell with spherical mirrors, these images suffer progressive distortion from astigmatism. However, other mirror designs reduce the astigmatism such that the final image can be passed with reasonable efficiency into a subsequent fiber bundle positioned in the image plane at the exit of the cell. The laser light passes into the next cell and the resultant Raman scattering generated in that cell passes back through the receiver fibers, through the previous cell, and finally into the spectrum analyzer. The practical limit of the number of concatenated cells is primarily the loss of light from multiple reflections from the mirrors in the cells. Therefore, it is important that the reflectance be relatively high for the laser and Raman wavelengths if multiple cells are used in a single system.

Figure 4:
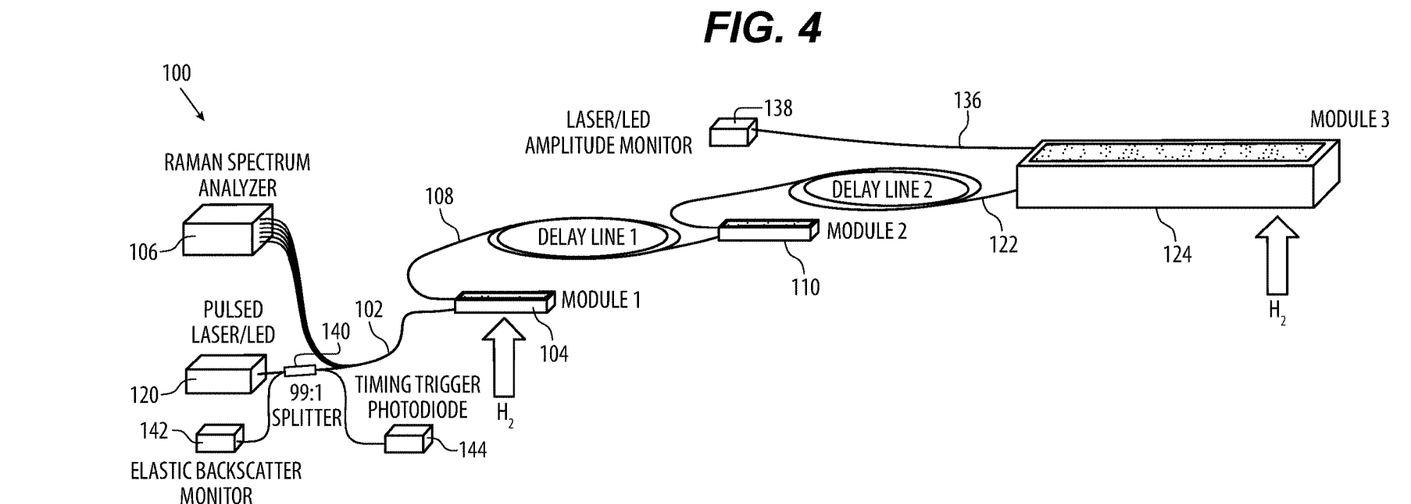
FIG. 4 is a schematic perspective view of the system of FIG. 1, showing three cell modules, where one is larger than the other two, in a backscatter configuration.

With reference now to FIG. 4, the first optical fiber bundle 102 is an initial optical fiber bundle, wherein the second optical fiber bundle 108 either connects directly to the second multi-pass cell 110 or to a daisy chain of one or more additional multi-pass cells 110, 124 alternating with delay lines 108, 102 (i.e. any suitable number of cells can be included), wherein the daisy chain ends with a final multi-pass cell 124. A terminal fiber optical bundle 136 operatively connects the final multi-pass cell 124 to a laser/LED amplitude monitor 138 that confirms the proper operation of the laser/LED and the passage of light through the entire operative path. The spectrum analyzer 106 is configured to detect presence of $H_2$ gas, $N_2$ gas, and $O_2$ gas in the multi-pass cells 104, 110, 124 based on observed spectral shifts in the returns, which are shown graphed out over time in FIG. 5. A 99:1 splitter 140 connected to the central illumination fiber 114 (labeled in FIG. 2) of the first optical fiber bundle 102. An elastic backscatter monitor 142 is operatively connected to the 99:1 splitter to confirm that the light from the laser/LED has passed completely through the chain of fibers and multi-pass cells and locate any breaks in the fiber or modules. A timing trigger photodiode 144 is operatively connected to the 99:1 splitter to start the timing of the return pulses into the spectrum analyzer and elastic backscatter monitor. As shown in FIG. 4, the third cell 124 is much larger than the other two cells 104, 110. Timing of return pulses can help locate the leak within the third cell 124, whereas for the smaller cells 104, 110, it may only be possible to determine that the leak is proximate the cell 104, 110, not specifically where in the cell 104, 110 the leak is. Smaller cells 104, 110 could be used to monitor locations like joints in an $H_2$ conduit system, e.g. where it may be obvious where a leak is if any $H_2$ is detected in the vicinity.

Figure 5:
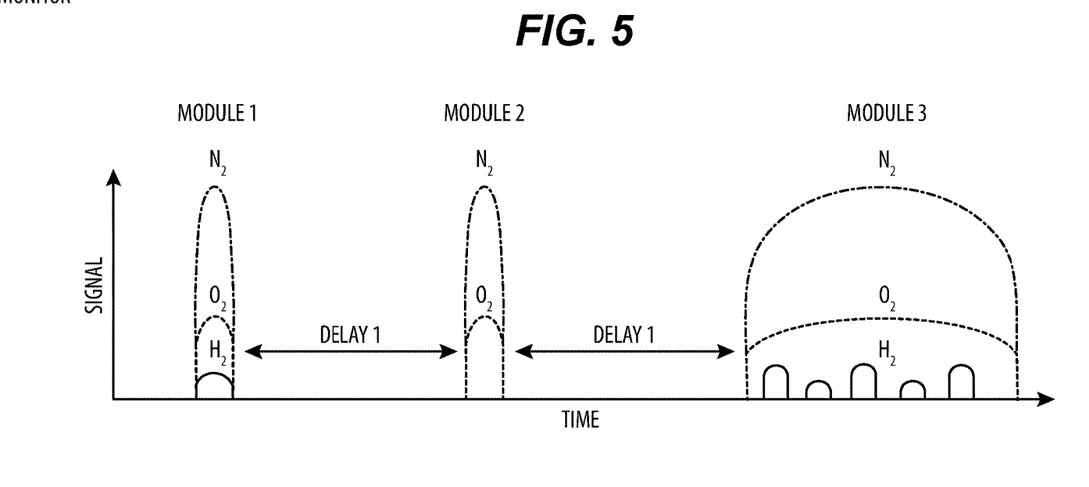
FIG. 5 is a graph of return signals over time for the system of FIG. 4, showing detection peaks for $H_2$, $N_2$, and $O_2$.

A potential advantage of systems and methods as disclosed herein is that a single system contains multiple sensor cells that can be placed at important locations and sampled by a single laser and spectrum analyzer. If the laser is pulsed with a short (i.e. several nanosecond) pulse, the Raman scatter can be resolved temporally. Depending on the pulse width and the size of the multi-pass cell, the spatial resolution may reveal the approximate location of the hydrogen gas within the multi-pass cell or, in the case of a small cell, simply indicate which cell within the chain has sensed the hydrogen gas. This is illustrated in FIG. 4, where the two small cells (Modules 1 and 2) generate a single return pulse for each of the gases present. The large cell (Module 3), like the smaller cells, generates a single long pulse from $N_2$ and $O_2$ and shorter pulses from the $H_2$ which enters the cell at the far end, as shown in FIG. 5. The pulses are created when the laser pulse repeatedly passes through the end of the cell where the $H_2$ is entering. The cells themselves can be easily resolved by placing sufficiently long lengths of fiber, e.g. delay lines 1 and 2 in FIG. 4, between adjacent cells to create delays in the arrival of the Raman signals, e.g. delays 1 and 2 indicated in the time axis of FIG. 5.

Figure 6:
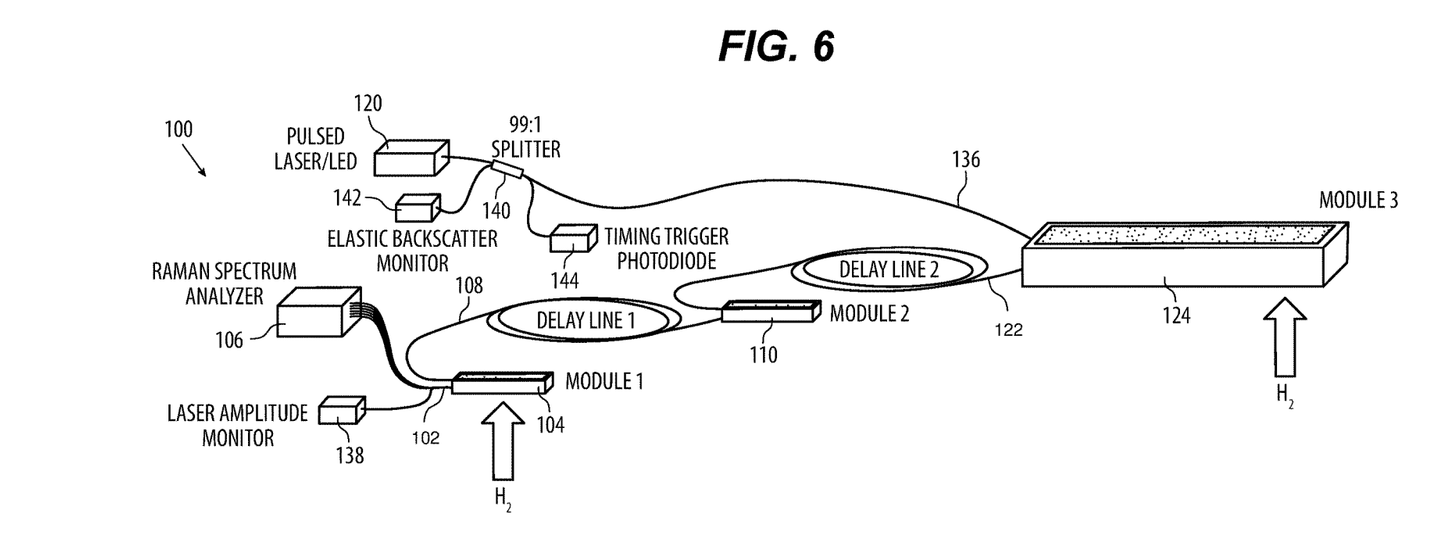
FIG. 6 is a schematic perspective view of a forward scatter configuration the system of FIG. 1.

With reference now to FIG. 6, another configuration of the system 100 is shown for forward scatter detection. In this configuration, timing of return pulses is not possible, but the return signal is stronger. The terminal fiber optical bundle 136 operatively connects the final multi-pass cell 124 to a pulsed laser/LED illumination source 120 to illuminate multi-path interiors of the multi-pass cells 104, 110, 124. A laser/LED amplitude monitor 138 is operatively connected to a central illumination fiber 114 (labeled in FIG. 2) of the first optical fiber bundle 102. The spectrum analyzer 106 is connected to the return fibers 116 (labeled in FIG. 2) at the end of the first optical fiber bundle 102 opposite the first multi-pass cell 104 for analyzing returns from the multi-pass cells 104, 110, 124. The 99:1 splitter is connected to the central illumination fiber 114 (labeled in FIG. 2) of the terminal optical fiber bundle 136. The elastic backscatter monitor 142 is operatively connected to the 99:1 splitter, as is the timing trigger photodiode 144 as described above with respect to FIG. 4.

Figure 7:
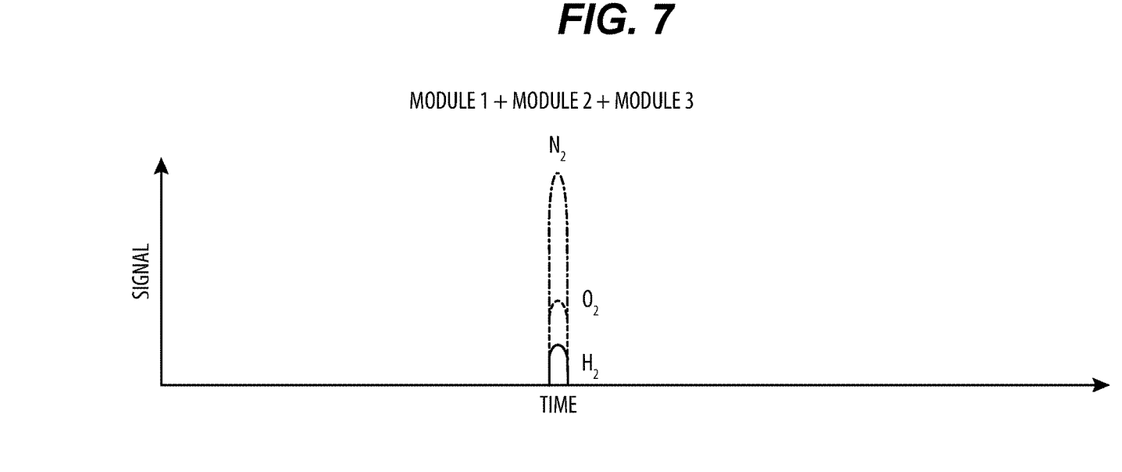
FIG. 7 is a graph of return signals over time for the system of FIG. 6, showing detection peaks for $H_2$, $N_2$, and $O_2$.

If spatial resolution is not required and detection of the presence of hydrogen gas in any of the sensors is sufficient, the configuration in FIG. 6 is useful. The laser propagates toward the spectrum analyzer, generating forward Raman scattering that enters the receiver fibers in the bundle. The Raman forward scattering is nearly as intense as the backscatter. The laser pulse and all the accumulated Raman scattering arrive simultaneously at the opposite end of the detector chain, as indicated in FIG. 7. The total number of mirror reflections is half that of the backscatter configuration shown in FIG. 4, and the cumulative Raman scattering will be more intense that than that spread temporally in a range-resolved configuration. Both effects contribute to an increase in the system sensitivity.

Figure 8:
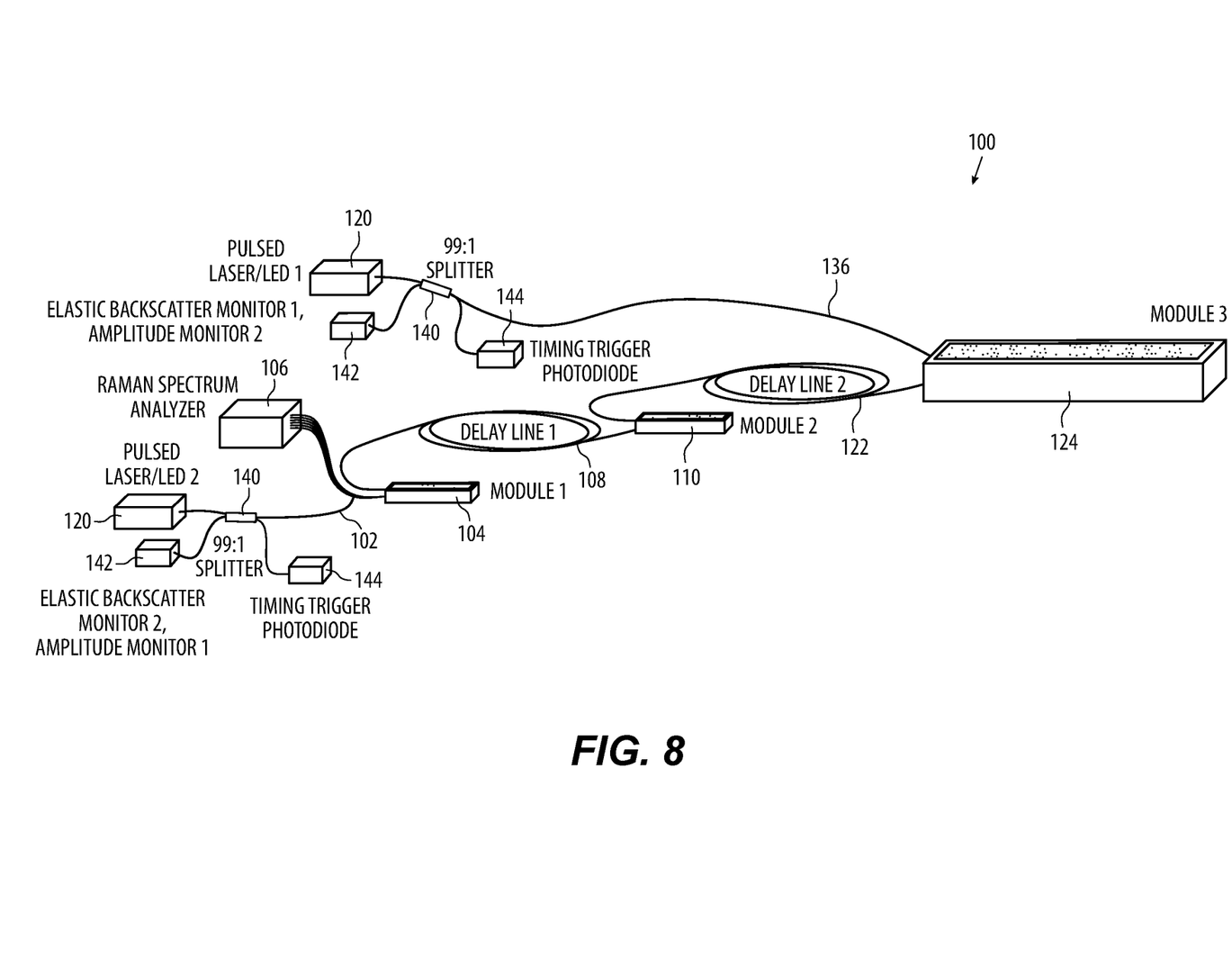
FIG. 8 is a schematic perspective view of a hybrid forward and backscatter configuration system of FIG. 1.

With reference now to FIG. 8, a configuration of the system 100 is shown which uses a combination of backscatter and forward scatter detection. As in FIG. 6, the terminal fiber optical bundle 136 operatively connects the final multi-pass cell 124 to a first pulsed laser/LED illumination source 120 to illuminate multi-path interiors of the multi-pass cells 104, 110, 124. As in FIG. 6, in FIG. 8 a first 99:1 splitter 140 is connected to the terminal optical fiber bundle 136, with a first elastic backscatter monitor 142 and a first timing trigger photodiode 144 connected thereto. The spectrum analyzer 106 is connected to the end of the first optical fiber bundle 102 opposite the first multi-pass cell 104 as described above. A second 99:1 splitter 140 is connected to the first optical fiber bundle 102 as described above with reference to FIG. 4, with a second elastic backscatter monitor 142 and a second timing trigger photodiode 144 operatively connected to the second 99:1 splitter 144. The second elastic backscatter monitor 142 is a first amplitude monitor for the first pulsed laser/LED illumination source 120, and the first elastic backscatter monitor 142 is a second amplitude monitor for the second pulsed laser/LED illumination source 120.

This system configuration uses a single Raman spectrum analyzer and two pulsed lasers/LEDs (Pulsed Laser/LED 1 and Pulse Laser/LED 2). The default mode is to sense the non-temporally resolved, cumulative forward Raman scattering, e.g. as shown in FIG. 7, because it will be more intense than the backscatter in the temporally-resolved system. If a hydrogen leak is detected, Pulsed Laser/LED 1 is turned off, and Pulse Laser/LED 2 is activated to identify where in the sensor chain the hydrogen gas is detected, e.g. as shown in FIG. 5. In either mode, the spectrum analyzer registers the ubiquitous Raman signatures of $N_2$ and $O_2$, regardless of the presence of $H_2$, verifying that the system is fully functioning.

The methods and systems of the present disclosure, as described above and shown in the drawings, provide for detecting and locating gaseous hydrogen leaks in aerospace and non-aerospace systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gas detection system comprising:
   a first optical fiber bundle connected to a first multi-pass cell for connecting the first multi-pass cell to a Raman spectrum analyzer;
   a second optical fiber bundle connected to the first multi-pass cell for connecting the first multi-pass cell to a second multi-pass cell;
   a terminal optical fiber bundle operatively connecting the second multi-pass cell to a laser/LED amplitude monitor;
   a 99:1 splitter connected to a central illumination fiber of the first optical fiber bundle;
   an elastic backscatter monitor operatively connected to the 99:1 splitter; and
   a timing trigger photodiode operatively connected to the 99:1 splitter.

2. The system as recited in claim 1, wherein the second optical fiber bundle includes a delay coil configured to provide temporal spacing between spectral returns from the first multi-pass cell and from the second multi-pass cell.

3. The system as recited in claim 1, wherein the first and second multi-pass cell is a biconic multipass cell with the first optical fiber bundle directed toward a first D-mirror, which is directed toward a T-mirror, which is directed toward a second D-mirror, which is directed toward the second optical fiber bundle.

4. The system as recited in claim 3, wherein the D-mirrors are on an opposite end of the first multi-pass cell from the T-mirror and the first and second optical fiber bundles, wherein the first multi-pass cell includes a gas permeable frame configured to expose illumination in a multi-pass pathway between the T-mirror and the D-mirrors to ambient gas.

5. The system as recited in claim 4, wherein the second multi-pass cell includes an identical multi-pass pathway to that of the first multi-pass cell.

6. The system as recited in claim 1, wherein each of the first and second optical fiber bundles includes the central illumination fiber for transmitting laser illumination, wherein the central illumination fiber is surrounded by a plurality of return fibers configured for transmitting return illumination from the first and second multi-pass cells.

7. The system as recited in claim 1, wherein the first multi-pass cell is sized identical to the second multi-pass cell.

8. The system as recited in claim 7, further comprising a pulsed laser/LED illumination source operatively connected to the central illumination fiber of the first optical fiber bundle to illuminate multi-path interiors of the first and second multi-pass cells.

9. The system as recited in claim 8, further comprising a spectrum analyzer connected to a plurality of return fibers at an end of the first optical fiber bundle opposite the first multi-pass cell for analyzing returns from the multi-pass cells, wherein the spectrum analyzer is configured to detect presence of $H_2$ gas, $N_2$ gas, and $O_2$ gas in the first and second multi-pass cells based on observed spectral shifts in the returns.

10. The system as recited in claim 9, further comprising a third optical fiber bundle operatively connected to the second multi-pass cell, configured to connect to one or more additional multi-pass cells.

11. The system as recited in claim 10, wherein the spectrum analyzer is configured to locate an $H_2$ gas leak proximate one of the multi-pass cells based on timing of spectral shifts in the return.

12. The system as recited in claim 11, wherein the spectrum analyzer is configured to determine which multi-pass cell the leak is proximate to, and what location in that multi-pass cell the leak is most proximate.

13. The system as recited in claim 1, wherein the second optical fiber bundle includes a delay coil configured to provide temporal spacing between spectral returns from the first multi-pass cell and from the second multi-pass cell, and the system further comprising:
the second multi-pass cell, wherein the first optical fiber bundle is an initial optical fiber bundle, wherein the second optical fiber bundle either connects directly to the second multi-pass cell or to a daisy chain of one or more additional multi-pass cells alternating with delay lines, wherein the daisy chain ends with the second multi-pass cell;
a pulsed laser/LED illumination source operatively connected to the central illumination fiber of the first optical fiber bundle to illuminate multi-path interiors of the multi-pass cells; and
a spectrum analyzer connected to a plurality of return fibers at an end of the first optical fiber bundle opposite the first multi-pass cell for analyzing returns from the multi-pass cells, wherein the spectrum analyzer is configured to detect a presence of $H_2$ gas, $N_2$ gas, and $O_2$ gas in the first and second multi-pass cells based on observed spectral shifts in the returns.

14. A gas detection system comprising:
a first optical fiber bundle connected to a first multi-pass cell for connecting the first multi-pass cell to a Raman spectrum analyzer;
a second optical fiber bundle connected to the first multi-pass cell for connecting the first multi-pass cell to a second multi-pass cell;
a terminal optical fiber bundle operatively connecting the second multi-pass cell to a pulsed laser/LED illumination source to illuminate multi-path interiors of the multi-pass cells;
a 99:1 splitter connected to a central illumination fiber of the terminal optical fiber bundle;
an elastic backscatter monitor operatively connected to the 99:1 splitter; and
a timing trigger photodiode operatively connected to the 99:1 splitter.

15. The system as recited in claim 14, wherein the second optical fiber bundle includes a delay coil configured to provide temporal spacing between spectral returns from the first multi-pass cell and from the second multi-pass cell, and the system further comprising:
the second multi-pass cell, wherein the first optical fiber bundle is an initial optical fiber bundle, wherein the second optical fiber bundle either connects directly to the second multi-pass cell or to a daisy chain of one or more additional multi-pass cells alternating with delay lines, wherein the daisy chain ends with the second multi-pass cell;
a laser/LED amplitude monitor operatively connected to a central illumination fiber of the first optical fiber bundle; and
a spectrum analyzer connected to a plurality of return fibers at an end of the first optical fiber bundle opposite the first multi-pass cell for analyzing returns from the multi-pass cells, wherein the spectrum analyzer is configured to detect a presence of $H_2$ gas, $N_2$ gas, and $O_2$ gas in the first and second multi-pass cells based on observed spectral shifts in the returns.

16. A gas detection system comprising:
a first optical fiber bundle connected to a first multi-pass cell for connecting the first multi-pass cell to a Raman spectrum analyzer;
a second optical fiber bundle connected to the first multi-pass cell for connecting the first multi-pass cell to a second multi-pass cell;
a terminal optical fiber bundle operatively connecting the second multi-pass cell to a first pulsed laser/LED illumination source to illuminate multi-path interiors of the multi-pass cells;
a first 99:1 splitter connected to a central illumination fiber of the terminal optical fiber bundle;
a first elastic backscatter monitor operatively connected to the first 99:1 splitter;
a first timing trigger photodiode operatively connected to the first 99:1 splitter;
a second 99:1 splitter connected to a central illumination fiber of the first optical fiber bundle;
a second elastic backscatter monitor operatively connected to the second 99:1 splitter; and
a second timing trigger photodiode operatively connected to the second 99:1 splitter.

17. The system as recited in claim 16, wherein the second optical fiber bundle includes a delay coil configured to provide temporal spacing between spectral returns from the first multi-pass cell and from the second multi-pass cell, and the system further comprising:
the second multi-pass cell, wherein the first optical fiber bundle is an initial optical fiber bundle, wherein the second optical fiber bundle either connects directly to the second multi-pass cell or to a daisy chain of one or more additional multi-pass cells alternating with delay lines, wherein the daisy chain ends with the second multi-pass cell; and a spectrum analyzer connected to a plurality of return fibers at an end of the first optical fiber bundle opposite the first multi-pass cell for analyzing returns from the multi-pass cells, wherein the spectrum analyzer is configured to detect a presence of $H_2$ gas, $N_2$ gas, and $O_2$ gas in the first and second multi-pass cells based on observed spectral shifts in the returns, wherein the second elastic backscatter monitor is a first amplitude monitor for the first pulsed laser/LED illumination source, and wherein the first elastic backscatter monitor is a second amplitude monitor for the second pulsed laser/LED illumination source.

* * * * *